Patented Nov. 13, 1934

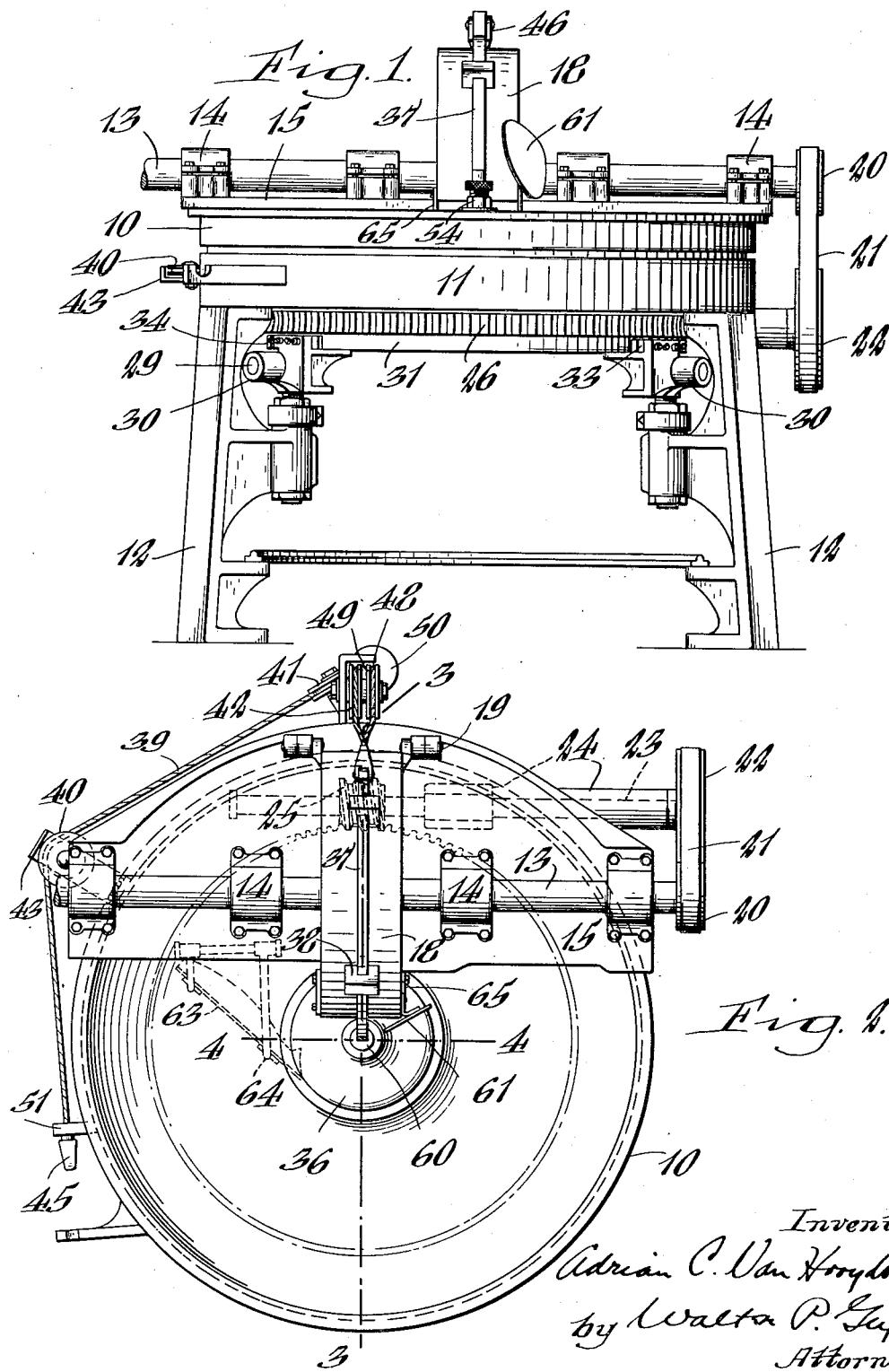

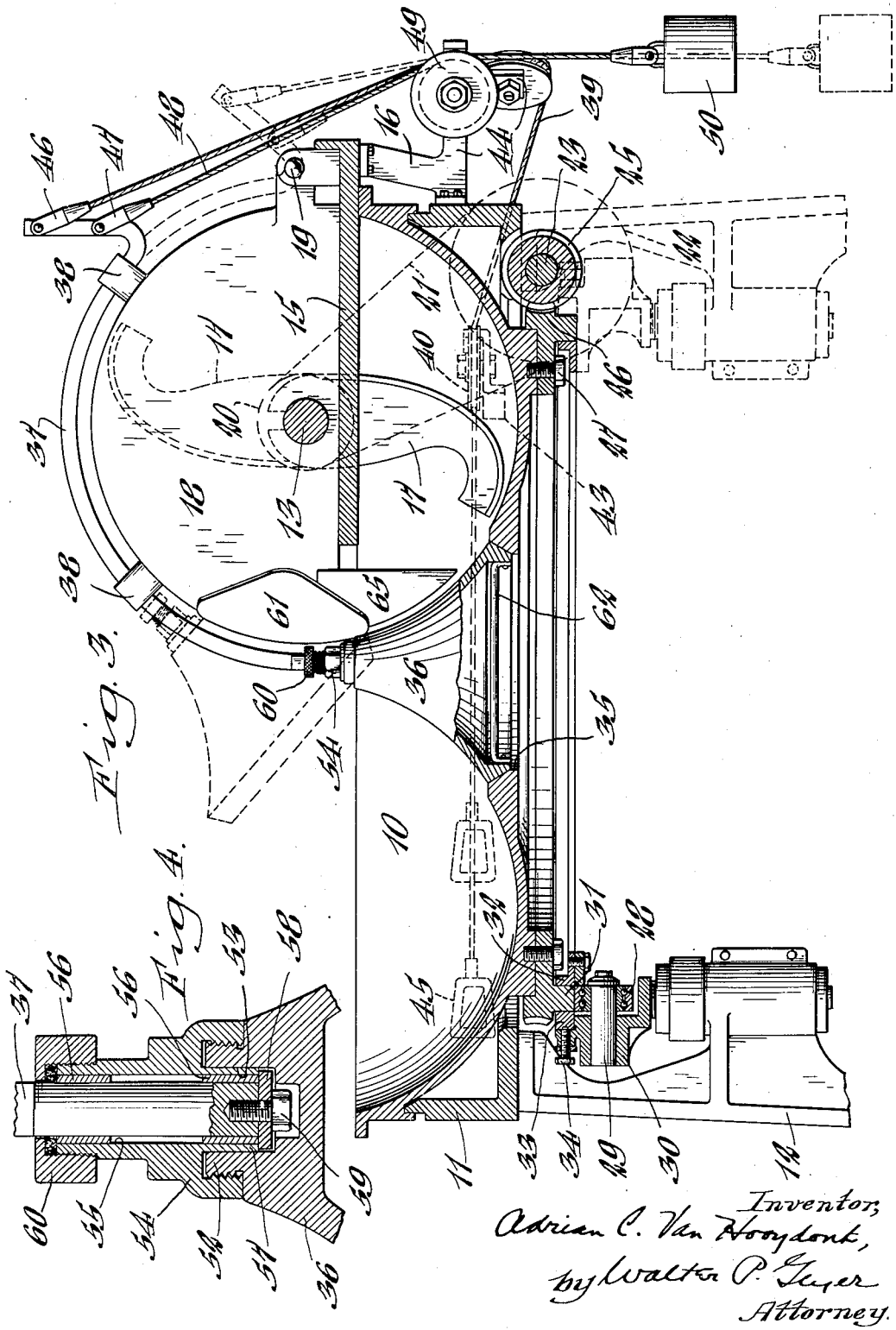

1,980,304

UNITED STATES PATENT OFFICE 1,980,304

MEAT CUTTING MACHINE

Adrian C. Van Hooydonk, Buffalo, N. Y., assignor to John E. Smith's Sons Company, Buffalo, N. Y., a corporation of New York Application July 18, 1932, Serial No. 623,041

7 Claims. (Cl. 146—67)

This invention relates generally to meat cutting machines employing a rotary bowl, and more particularly to improvements in the means for effecting the removal or discharge of the contents from the bowl.

One of its objects is to provide a machine of this character having simple and efficient means for controlling the discharge of the bowl-contents centrally of its bottom, and which means are so designed and constructed as to be easily and conveniently manipulated by the operator with a minimum of effort and with maximum safety.

Another object of the invention is to provide a center discharge mechanism for meat cutting machines which is so designed that it does not interfere with the normal operation of the machine, and which embodies means for cleaning the closure or plug of the discharge opening in the bowl.

A further object is the provision of a center discharge means for machines of this character which is simple, compact and inexpensive in construction, and whose parts are so organized as to render the cleaning of the meat bowl, as well as the discharge plug or valve a simple task.

Other features of the invention reside in the construction and arrangement of parts hereinafter described and particularly pointed out in the appended claims.

In the accompanying drawings:—Figure 1 is a front elevation of a meat cutting machine embodying my invention. Figure 2 is a top plan view thereof. Figure 3 is an enlarged fragmentary transverse section taken in the plane of line 3—3, Figure 2. Figure 4 is an enlarged fragmentary section showing the manner of detachably coupling the closure or value plug to its supporting member, the section being taken substantially in the plane of line 4—4, Figure 2.

Similar characters of reference indicate corresponding parts throughout the several views.

In the preferred embodiment of the invention shown in the drawings, the same is depicted in connection with a meat cutting machine of the rotary bowl type, the numeral 10 indicating a meat bowl which is of the customary trough or concavo-convex form supported at its periphery on a frame or bed ring 11 which is in turn mounted on suitable supports or legs 12. Disposed over the meat bowl at one side of the axis thereof, is a drive shaft 13 which is journaled in suitable bearings 14 applied to a cover plate 15 arranged over the rear portion of the bowl and supported by suitable brackets 16 attached to the bed ring, as seen in Figure 3. Mounted on this drive shaft and extending into the bowl are a plurality of knives or cutters 17 which are adapted to revolve in the bowl during its rotation for cutting meat and other foods. A suitable hood or guard 18 is provided for enclosing the cutters, the same being hinged at 19 to permit the same to be raised to expose the cutters for replacement when desired.

The shaft 13 also serves to rotate the bowl 10 and for this purpose the same is provided at one end with a pulley or sprocket 20 connected by a belt or chain 21 with a corresponding pulley or sprocket 22 mounted on a parallel counter shaft 23 disposed beneath the bowl preferably adjacent one side thereof and journaled in appropriate bearings 24 applied to the bed ring 11 or other appropriate part of the machine. Mounted on the counter shaft is a worm 25 meshing with a worm wheel 26 secured to the bottom side of the meat bowl by bolts 27. The drive shaft 13 may be driven by an electric motor or other suitable source of power.

In addition to being supported from the bed ring 11, the meat bowl is preferably also supported at its bottom side on antifriction rollers 28 journaled on horizontal arbors 29 carried by brackets 30 supported on the legs 12 of the machine. The worm wheel 26 is provided on its bottom side with an annular rim 31 which rests upon the peripheral faces of the rollers 28 and thereby effects a free revolving movement of the meat bowl. Engaging the inner and outer concentric faces of the worm wheel rim 31, are suitable bearing elements 32 and 33, the outer bearing element 33 being preferably in the form of segments which are adjustable radially toward and from the outer face of the rim by one or more adjusting screws 34.

The meat bowl 10 is provided centrally or axially of its bottom with a discharge opening 35 through which the chopped meat or other food is emptied or dumped into a suitable receptacle provided for receiving it, the position of the supporting legs 12 being such as to permit the receptacle to be conveniently placed beneath the bowl or to be removed therefrom. This discharge opening, during the cutting operation, is closed by a suitable valve plug or closure 36 of substantially conical shape so as to conform substantially to the contour of the trough-shaped bowl, as shown in Figure 3. This closure is suspended over the meat bowl for movement into and out of its closed position and for this purpose is preferably attached to or suspended from the lower end of a support or guide stem 37 which is of arcuate shape, as seen in Figure 3, and follows the contour of the semi-circular shaped knife hood 18. Said closure stem engages guide blocks or elements 38 secured to the outer face of the cutter-hood for guiding the same vertically in an arcuate path, the hood constituting a carrier for the closure-stem.

The means for effecting the movement of the closure 36 to its open and closed positions preferably consists of an operating cable 39 including substantially horizontal and vertically-disposed portions or stretches extending around the side and the rear portion of the meat bowl 10 and thence upwardly therefrom and guided on suitable sheaves 40, 41 and 42, the sheave 40 being disposed horizontally and mounted on a suitable bracket 43 secured to the bed ring 11 adjacent the side thereof and the sheaves 41 and 42 being disposed vertically at an angle to each other in the manner shown in Figure 2 and supported on appropriate brackets 44 disposed adjacent the rear side of the bed ring. At its front end, this operating cable terminates in a suitable handle 45 while its rear end, after passing around the sheaves 40, 41 and 42, respectively, is directed upwardly and is connected to a suitable coupling element 46 attached to the upper or rear end of the closure stem 37. Also connected to the stem alongside the coupling element 46 of the operating cable 39, is a second coupling element 47 from which depends a second cable 48 guided on a sheave 49 disposed alongside the sheave 42 and terminating at its lower end in a counter weight 50. This weight counterbalances the weight of the closure plug 36 and renders the opening of the plug comparatively easy, and this weight also acts to hold the plug in its elevated position, shown by dotted lines in Figure 3. The plug 36 is held in its lowered or closed position by its own weight, and in this position of the parts, the handle 45 of the operating cable 49 may abut against an apertured lug 51 projecting from the bed ring 11 of the machine. It will be noted from Figure 3, that the closure plug is preferably so formed or shaped that it conforms to the outer face of the hood 18 thereby permitting it to be elevated in overlying relation to the hood with the desired clearance when shifting the same to its open and closed positions.

In its closed position, the closure or plug 36 is adapted to revolve with the meat bowl independently of its supporting stem 37 and for this purpose it is revolvably mounted on the lower end of its stem, in such a manner that it can be readily removed when desired for cleaning or other purposes. As shown in Figures 3 and 4, the plug is preferably hollow or bell-like in shape, being provided at its upper end with an externally threaded attaching neck 52 and a socket or recess 53 into which the lower end of the supporting stem 37 extends. Applied to the lower end of the latter for engagement with the plug-neck 52 is a coupling member or nut 54 and interposed between the smooth bore 55 of this nut and the stem are bushings 56. Said nut has an internal sleeve 57 at its lower end which engages the recess 53 and which abuts at its lower end against a washer or shoulder 58 secured to the lower end of the plug-stem 37 by a bolt 59. By this construction, should it be desired to remove the plug 36 for any reason, or conversely, to detach the plug-stem therefrom, the nut 54 is unscrewed from the plug-neck, thereby enabling the plug to be slipped from the nut-sleeve 57, the nut being held on the stem 37 by the washer 58. If desired, a packing nut or gland 60 may be applied to the upper end of the coupling nut 54 about the plug-stem to prevent leakage of water into the plug-bearing during washing of the bowl or plug.

Means are provided for effectually scraping or cleaning the exterior surface of the plug 36 while the same is in its elevated position shown by dotted lines in Figure 3, and for this purpose I provide a scraper or blade 61 preferably attached to the knife-hood 18 and of the proper shape to conform to the surface of the plug. When in the elevated position above referred to, the plug is manually revolved or oscillated back and forth about its stem 37 relative to the scraper, thereby readily removing any matter from the surface of the plug. For convenience, the plug may be provided with a handle 62 which is preferably disposed within the lower portion of the plug.

In emptying the meat contents from the bowl 10, it is desirable to provide a deflector or blade 63, represented by dotted lines in Figure 2, which may be mounted on a swinging frame 64 hinged to the cover plate 15 and movable into and out of operative position. In its lowered operative position, this blade scrapes the meat from the walls of the bowl and directs it into the discharge opening 35 as the bowl is revolved.

The front end of the knife-hood 18 projects somewhat beyond the corresponding edge of the cover plate 15 and in order to safeguard the operator from accidentally reaching his hands into the path of travel of the knives 17 beneath such end of the hood, I employ guard plates 65 which are preferably secured to and depend from the opposite sides of the overhanging front end of said hood, as seen in Figure 3. The front edges of these guard plates are curved to conform to the adjoining face of the plug 36.

I claim as my invention:—

1. In a machine of the character described, the combination of a frame, a rotary bowl supported thereon and having a discharge opening in its bottom, a support guided for movement over the bowl in a direction toward and from its discharge opening, a closure for said opening suspended from one end of said support, and an operating cable guided on said frame and connected to the opposite end of said support for controlling the movement of said closure to its open and closed positions.

2. In a machine of the character described, the combination of a frame, a rotary bowl supported thereon and having a discharge opening in its bottom, a support guided for movement over the bowl in a direction toward and from its discharge opening, a closure for said opening suspended from one end of said support, and an operating cable connected to the opposite end of said support for controlling the movement of said closure to its open and closed positions, said frame having guide elements thereon and said cable including a substantially horizontal stretch and a substantially upright stretch engaging said guide elements.

3. In a machine of the character described, the combination of a frame, a rotary bowl supported thereon and having a discharge opening in its bottom, a support guided for movement over the bowl in a direction toward and from its discharge opening, a closure for said opening suspended from one end of said support, an operating cable guided on said frame and connected to the opposite end of said suport for controlling the movement of said closure to its open and closed positions, and a counter weight suspended from the last-named end of said support for holding the closure in its open, elevated position.

4. In a machine of the character described, the combination of a rotary bowl having a discharge opening therein, a support suspended over the bowl for movement toward and from the same to assume a position in alinement with said opening and to an elevated position over the same, a closure revolvably mounted on said support and engageable with said discharge opening in one position thereof, and a scraper disposed in spaced relation over said opening and engageable with the closure in the elevated position of its support.

5. In a machine of the character described, the combination of a rotary bowl having a discharge opening therein, a vertically-swinging carrier fulcrumed above and at one side of said discharge opening, a support attached to said carrier for movement therewith and relatively thereto toward and from the discharge opening, a closure for said opening suspended from said support, and a scraping means applied to said carrier and engageable with said closure in one position thereof.

6. In a food cutting machine, the combination of a bowl having a central discharge opening in its bottom, a cutter shaft disposed transversely over the bowl at one side of its discharge opening, a hood enclosing the cutters of said shaft, a closure for said discharge opening having a support rising therefrom guided for movement on said hood, means for actuating said support to bring the closure to its open and closed positions, and a scraper applied to said hood and disposed for engagement with said closure in its open position.

7. In a food cutting machine, the combination of a meat bowl having a discharge opening therein, a revolvable closure for said discharge opening having a guide stem rising therefrom, means for supporting said stem for movement toward and from the discharge opening, means for elevating said stem to bring the closure to an open or closed position, and a scraper engageable with the surface of said closure in its open elevated position, said closure being revolvable about the stem and having a handle thereon for actuating it.

ADRIAN C. VAN HOOYDONK.